(12) United States Patent
Mizutani et al.

(10) Patent No.: US 9,411,099 B2
(45) Date of Patent: Aug. 9, 2016

(54) OPTICAL WAVEGUIDE AND MANUFACTURING METHOD OF OPTICAL WAVEGUIDE

(71) Applicant: NEC Corporation, Minato-ku, Tokyo (JP)

(72) Inventors: Kenji Mizutani, Tokyo (JP); Shigeru Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/611,411

(22) Filed: Feb. 2, 2015

(65) Prior Publication Data

US 2015/0219844 A1    Aug. 6, 2015

(30) Foreign Application Priority Data

Feb. 4, 2014   (JP) .................................. 2014-019229

(51) Int. Cl.
| G02B 6/10 | (2006.01) |
| G02B 6/136 | (2006.01) |
| G02B 6/122 | (2006.01) |
| G02B 6/12 | (2006.01) |

(52) U.S. Cl.
CPC .............. *G02B 6/136* (2013.01); *G02B 6/1228* (2013.01); *G02B 2006/12097* (2013.01)

(58) Field of Classification Search
USPC ........................................................ 385/131
See application file for complete search history.

(56) References Cited

U.S. PATENT DOCUMENTS

| 6,108,478 | A | * | 8/2000 | Harpin | ................. | G02B 6/1228 385/129 |
| 6,253,009 | B1 | * | 6/2001 | Lestra | .................. | G02B 6/1228 257/E31.127 |
| 7,088,890 | B2 | | 8/2006 | Liu | | |
| 7,184,207 | B1 | * | 2/2007 | Walker | ................. | G02B 6/1228 359/344 |
| 2005/0008314 | A1 | * | 1/2005 | Drake | .................. | G02B 6/1228 385/129 |
| 2015/0086153 | A1 | * | 3/2015 | Ono | ...................... | G02B 6/1228 385/11 |
| 2015/0260915 | A1 | * | 9/2015 | Kitamura | ............... | G02B 6/136 385/131 |
| 2015/0277054 | A1 | * | 10/2015 | Park | ....................... | G02B 6/305 385/14 |

FOREIGN PATENT DOCUMENTS

| JP | 2001033642 A | 2/2001 |
| JP | 2001510589 A | 7/2001 |
| JP | 4719259 B2 | 4/2011 |
| WO | 2012-042795 A1 | 4/2012 |

OTHER PUBLICATIONS

Nakamura et al., "High extinction ratio optical switching independently of temperature with silicon photonic 1×8 switch", OFC2012, OTu2I.3.

* cited by examiner

*Primary Examiner* — Sung Pak

(57) ABSTRACT

An optical waveguide of the present invention is an optical waveguide having a first rib and a second rib being provided on a slab layer along one direction from one side to the other side and a barrier layer being connected between said first rib and said second rib, in which: the first rib includes a first taper part having a width widening from a first end in said one side to a second end connected with said barrier layer; and the second rib includes a first layer and a second layer laminated on a face of said slab layer in turn.

17 Claims, 18 Drawing Sheets

Fig.12
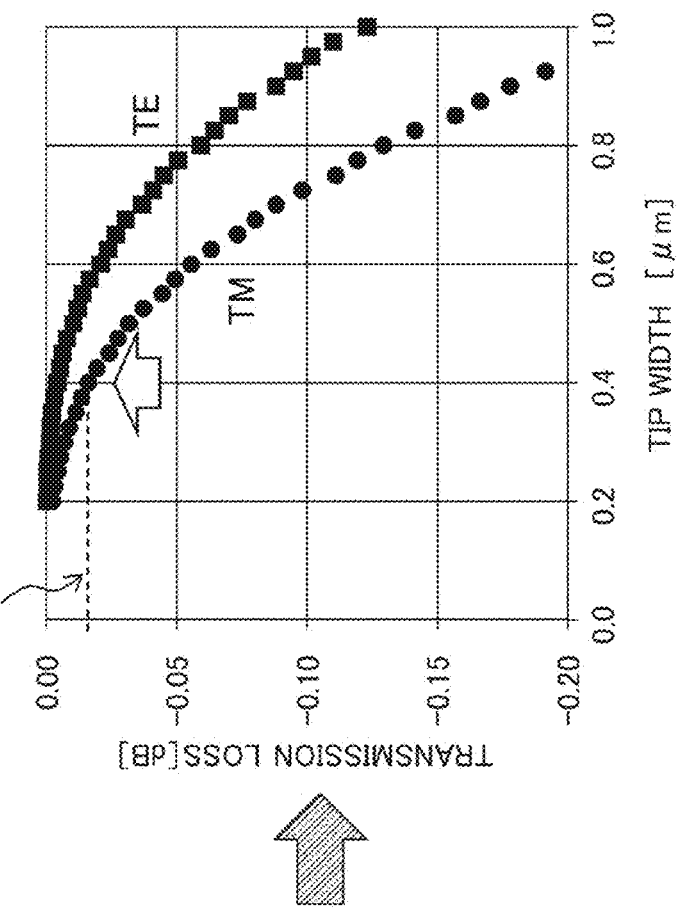
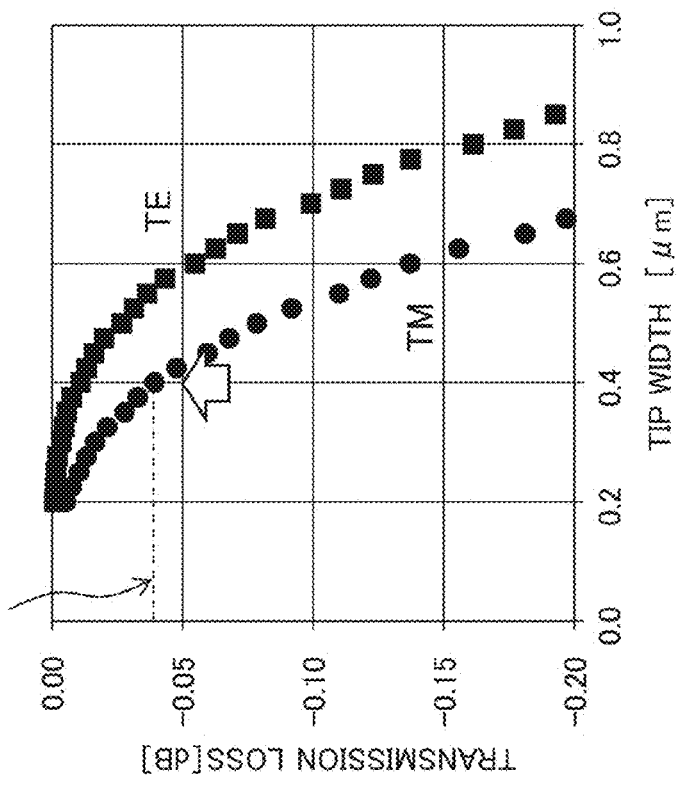

Fig. 16
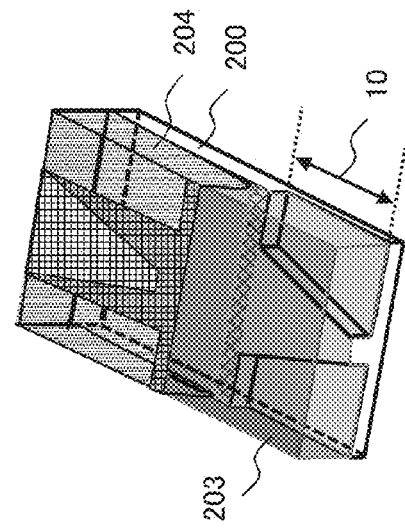
(D) FORMATION OF ADDITIONAL CORE
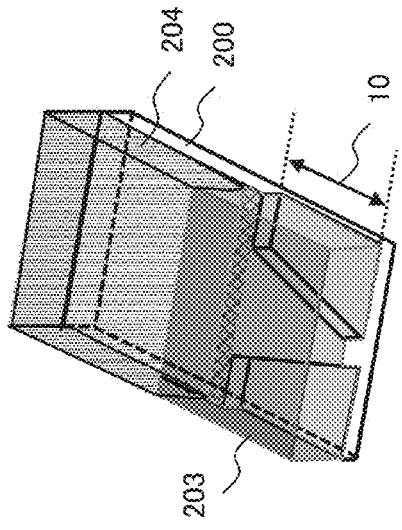
(E-1) FORMATION OF FIRST PROTECTION LAYER
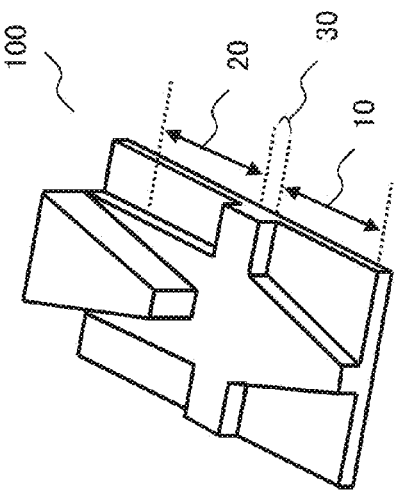
(E-4) REMOVAL OF PROTECTION LAYER
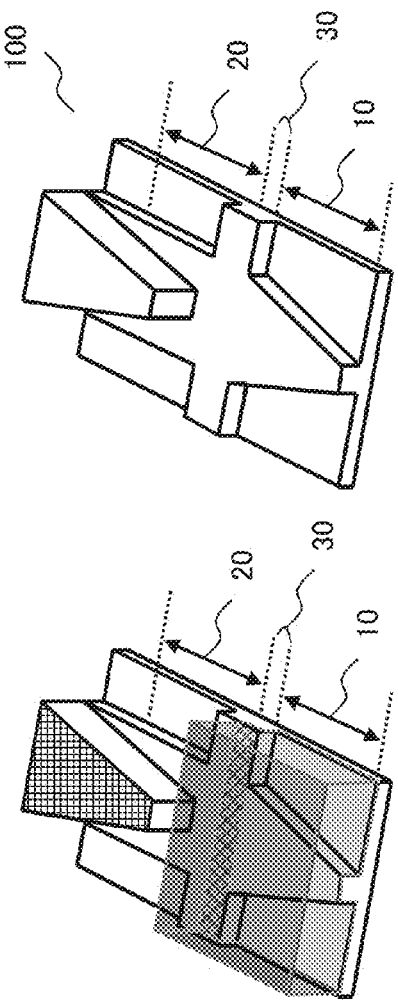
(E-2) FORMATION OF SECOND LAYER
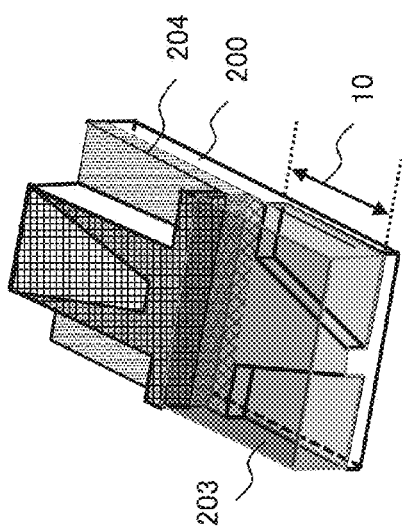
(E-3) FORMATION FIRST LAYER Fig. 17
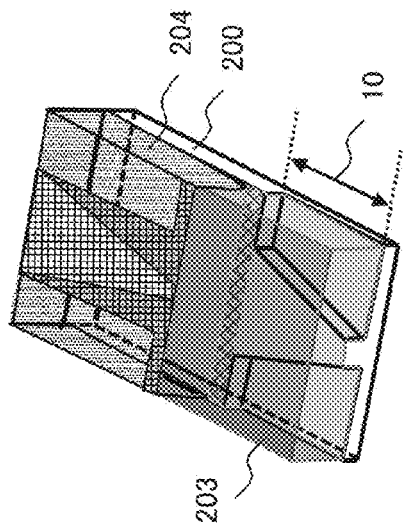
(D) FORMATION OF ADDITIONAL CORE
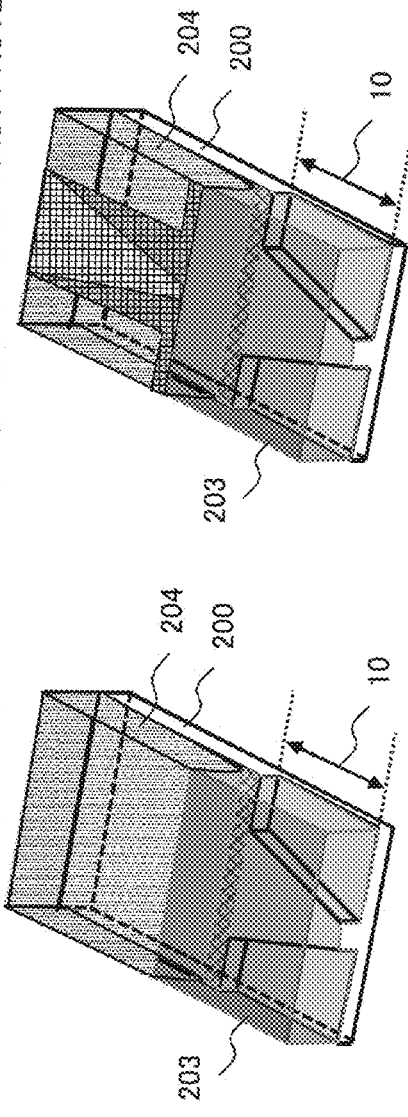
(E-1) FORMATION OF FIRST PROTECTION LAYER
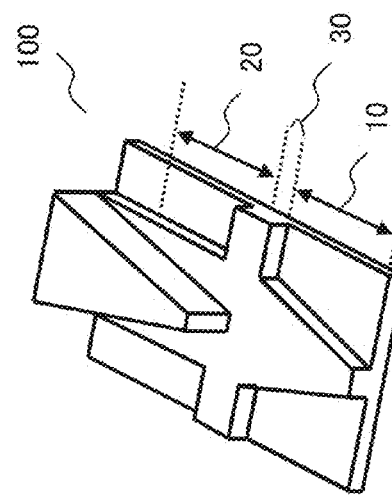
(E-4) REMOVAL OF PROTECTION LAYER
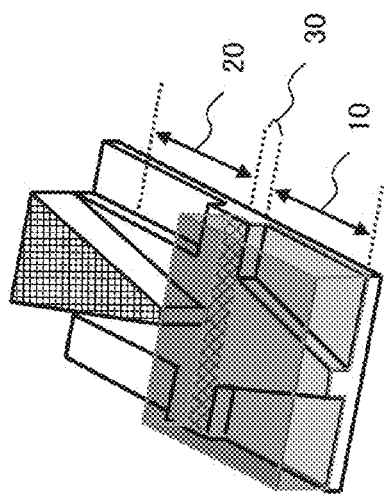
(E-3) FORMATION FIRST LAYER
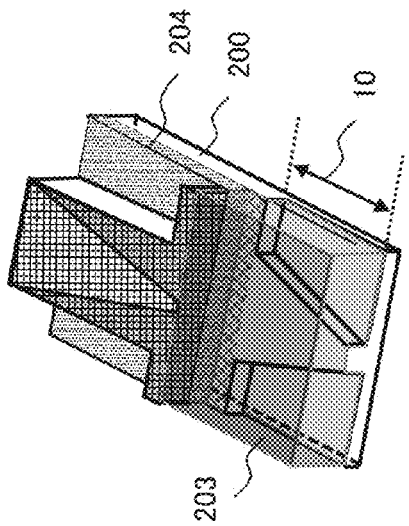
(E-2) FORMATION OF SECOND LAYER

US 9,411,099 B2

OPTICAL WAVEGUIDE AND MANUFACTURING METHOD OF OPTICAL WAVEGUIDE

This application is based upon and claims the benefit of priority from Japanese Patent Application No. 2014-019229 filed on Feb. 4, 2014, the disclosure of which is incorporated herein in its entirety by reference.

TECHNICAL FIELD

The present invention relates to an optical waveguide and a manufacturing method of an optical waveguide, and, more particularly, to an optical waveguide and a manufacturing method of an optical waveguide which reduce transmission loss of guided light.

BACKGROUND ART

As one of silicon optical waveguides, there is a silicon rib type optical waveguide of non-patent document 1 ("High extinction ratio optical switching independently of temperature with silicon photonic 1×8 switch", Nakamura et al., OFC2012, OTu2I.3), which makes the confinement in the lateral direction strong by providing a projection shape of silicon of approximately 1 μm width to a waveguide of a silicon thin film called a slab formed onto a substrate. This rib type optical waveguide can suppress formation of higher-order modes in the waveguide, and can suppress PDL (Polarization Dependent Loss).

The size of the principal mode of light of this rib type optical waveguide is about 1 μm, while the size of the principal mode of light of a usual single mode fiber is large and is about 9 μm. When a single mode fiber and a rib type optical waveguide are connected together, a coupling loss is large because of such difference between the sizes of principal modes of light.

As one of methods to reduce such coupling loss, there is introduction of a spot-size converter of a core expansion type that makes the diameter of the principal mode of light of a rib type optical waveguide large by gradually enlarging a core toward an optical fiber. A plurality of spot-size converters have been proposed up to now, and, for example, there has been proposed, as disclosed in patent documents 1-5 (Japanese Patent Application Laid-Open No. 2001-033642, Japanese Patent Publication No. 4719259, Published Japanese translation of PCT application No. 2001-510589, U.S. Pat. No. 7,088,890 and International Publication No. WO 2012/04279), an optical waveguide having a spot size conversion function made by stacking two or more silicon core layers whose widths widen gradually.

Methods to create an optical waveguide having such multi-stage spot size conversion function include a method to form an optical waveguide having a spot size conversion function by: making an additional core layer regrow thick over a wide area including an area for forming the spot size conversion function; and applying etching after that.

However, as shown in FIG. 18, in this manufacturing method, a barrier layer 903 which extends in the direction crossing a rib type optical waveguide at right angles occurs between the region of the optical waveguide in the side of an optical function device and the region of the spot size conversion function in which the core layer have been made grow. The reason of this is that the region of the optical waveguide in the device side and the region of the spot size conversion function are formed separately. Specifically, it is caused by forming a mask with a margin in the boundary area between the two above-mentioned regions formed separately because one of the regions is formed after the other region is covered by a mask. When the barrier layer 903 exists, it is concerned that coupling to higher-order modes and transmission loss by reflection is caused. Regarding such transmission loss, it is known that the transmission loss can be suppressed by introducing taper structures 901-1 and 901-2 disclosed in non-patent document 2 ("Taper-Integrated Multimode-Interference Based Waveguide Crossing Design", Chyong-Hua Chen, IEEE Journal of Quantum Electronics, VOL. 46, NO. 11 and pp 1656-1661) into optical waveguides before and behind the barrier layer as shown in FIG. 18.

SUMMARY

An object of the present invention is to make an optical waveguide short.

Solution to Problem

An optical waveguide to an exemplary aspect of the invention includes a first rib and a second rib being provided on a slab layer along one direction from one side to the other side, and a barrier layer being connected between the first rib and the second rib, comprising:

the first rib including a first taper part having a width widening from a first end in the one side to a second end connected with the barrier layer;

the second rib including a first layer and a second layer laminated on a face of the slab layer in turn;

the first layer having an approximately same width as the second end and being of a shape having one of a same width and a width widening from a third end being connected with the barrier layer to a fourth end in the other side;

the second layer having a second taper part having a width widening from a fifth end in the one side to a sixth end; and both of one end and the other end of the barrier layer in the one direction having a width wider than the second end and the third end.

BRIEF DESCRIPTION OF THE DRAWINGS

Exemplary features and advantages of the present invention will become apparent from the following detailed description when taken with the accompanying drawings in which:

FIG. 12 is a diagram showing dependence of transmission loss of an optical waveguide in the example 1 and in a comparative example of the present invention to the width of a third end (rib width) and the width of a fifth end 42 (tip width);

FIG. 16 is a diagram showing a detailed specific example of process E in an example of the manufacturing method of an optical waveguide in the first exemplary embodiment of the present invention;

FIG. 17 is a diagram showing a detailed specific example of process E in an example of a manufacturing method of an optical waveguide in the second exemplary embodiment of the present invention.

EXEMPLARY EMBODIMENT

Hereinafter, exemplary embodiments of the present invention will be described. Each exemplary embodiment is just illustration, and the present invention is not limited to each of the exemplary embodiments.

[First Exemplary Embodiment]

Figure 1:
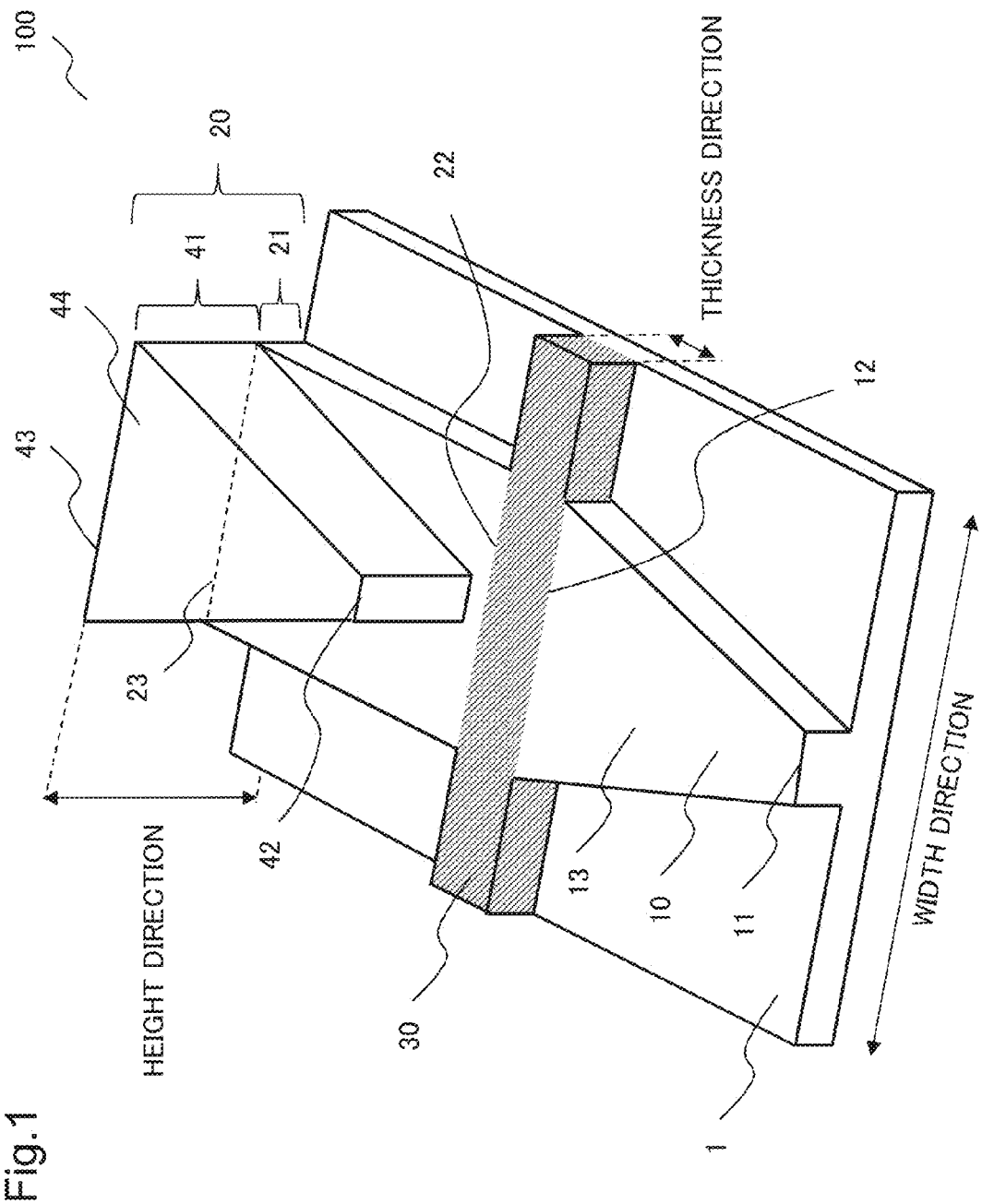
FIG. 1 is a diagram showing an exemplary configuration of an optical waveguide in a first exemplary embodiment of the present invention.

The first exemplary embodiment of the present invention will be described. FIG. 1 indicates a bird's eye view of an exemplary configuration of an optical waveguide in the first exemplary embodiment of the present invention.

[Description of Structure]

Hereinafter, an example of a structure of an optical waveguide in this exemplary embodiment will be described with reference to FIG. 1. As shown in FIG. 1, an optical waveguide 100 has a slab layer 1, a first rib 10, a second rib 20 and a barrier layer 30.

The optical waveguide 100 is an optical waveguide in which the first rib 10 and the second rib 20 are provided on the slab layer 1 along one direction from one side to the other side, and, further, the barrier layer 30 is joined between the first rib 10 and the second rib 20. In FIG. 1, "one side" is the front left side of the illustration and "the other side" is the right back side of the illustration. Also, as shown in FIG. 1, the thickness direction of the barrier layer 30 is a direction of the thickness of the barrier layer in one direction from "one side" to "the other side".

The first rib 10 has a first taper part 13, the width of which is made wider from a first end 11 in "one side" toward a second end 12 connected to the barrier layer 30. Thus, by the width of the first rib 10 changing gradually and continuously, the shape of the principal mode of guided light can be converted toward the width direction of FIG. 1 with low loss.

The second rib 20 has a first layer 21 and a second layer 41 laminated on a face of the slab layer 1 in turn.

Figure 2:
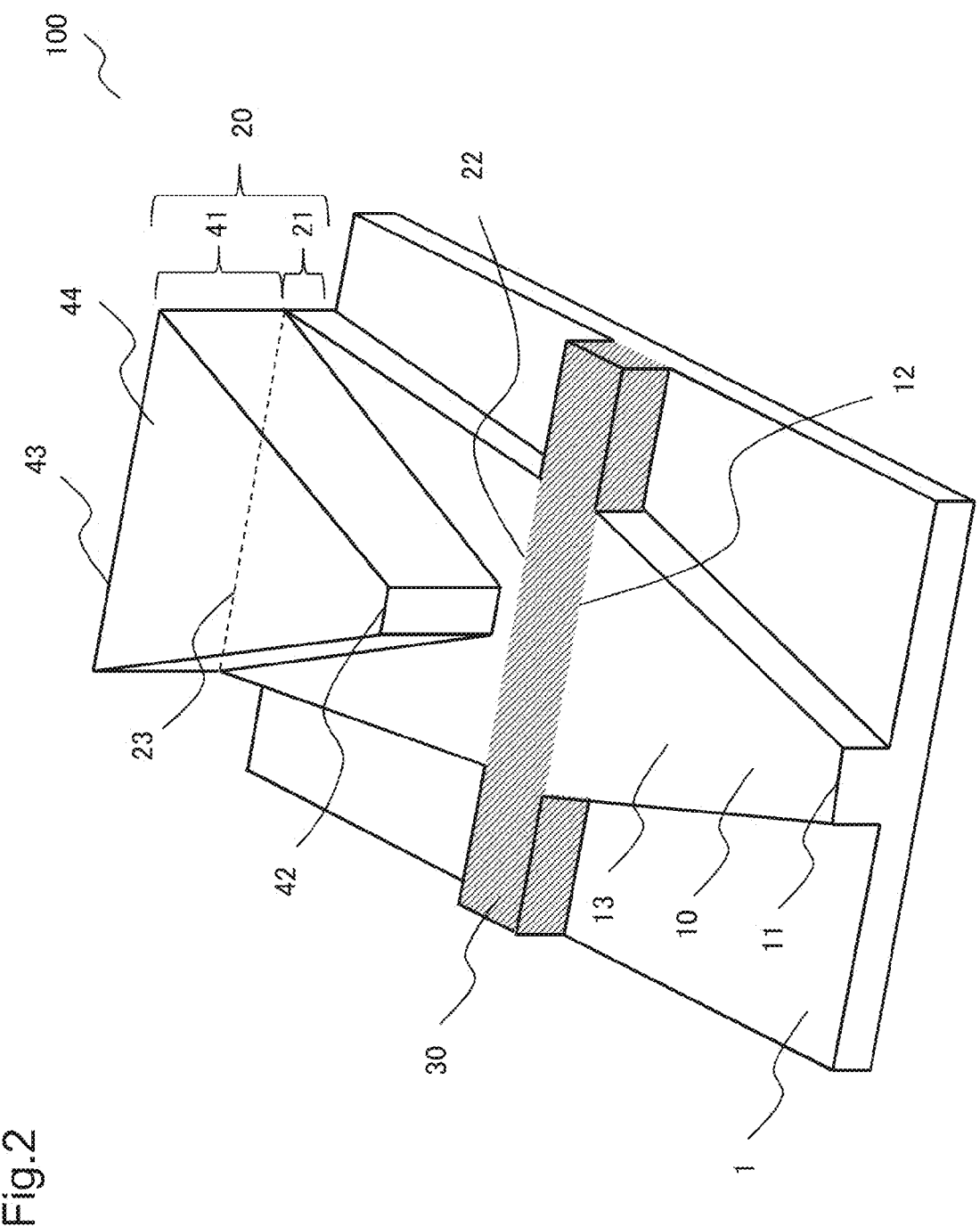
FIG. 2 is a diagram showing another exemplary configuration of an optical waveguide in the first exemplary embodiment of the present invention.

The first layer 21 is the same width as the second end 12 approximately and, in addition, is of a shape having a width that is the same or becomes wider from a third end 22 connected with the barrier layer 30 to a fourth end 23 in "the other side" as shown in FIG. 2. Both of one end and the other end of the barrier layer 30 in the above-mentioned one direction have a width wider than the second end 12 and the third end 22. When the first layer 21 has a shape that becomes wider from the third end 22 to the fourth end 23 as shown in FIG. 2, the width of the first layer 21 changes gradually and continuously. Therefore, the shape of the principal mode of guided light can be converted toward the width direction in FIG. 2 with low loss as is the case with the first rib 10. In this case, the principal mode of light guided from the first end 11 to the fourth end 23 except for the barrier layer 30 can be converted with low loss toward the width direction continuously. Also, by making the third end 22 be approximately the same width with the second end 12, electromagnetic field distribution of light in boundary surfaces between the second end 12, the barrier layer 30 and the third end 22 is rarely different, and, as a result, coupling loss can be suppressed. Further, polarization dependence of transmission loss of guided light which occurs in the barrier layer 30 can be reduced by making the third end 22 have approximately the same width with the second end 12.

The second layer 41 has a second taper part 44 that becomes wider from a fifth end 42 in "one side" to a sixth end 43. Thus, the shape of the principal mode of guided light in the height direction in FIG. 1 can be converted with low loss by the width of the second layer 41 changing continuously and gradually.

[Description of Manufacturing Method]

Next, a manufacturing method of the optical waveguide 100 of this exemplary embodiment will be described taking formation of an optical waveguide by etching as an example with reference to FIG. 3. The manufacturing method will be described as five processes indicated by A-E in FIG. 3.

Figure 3:
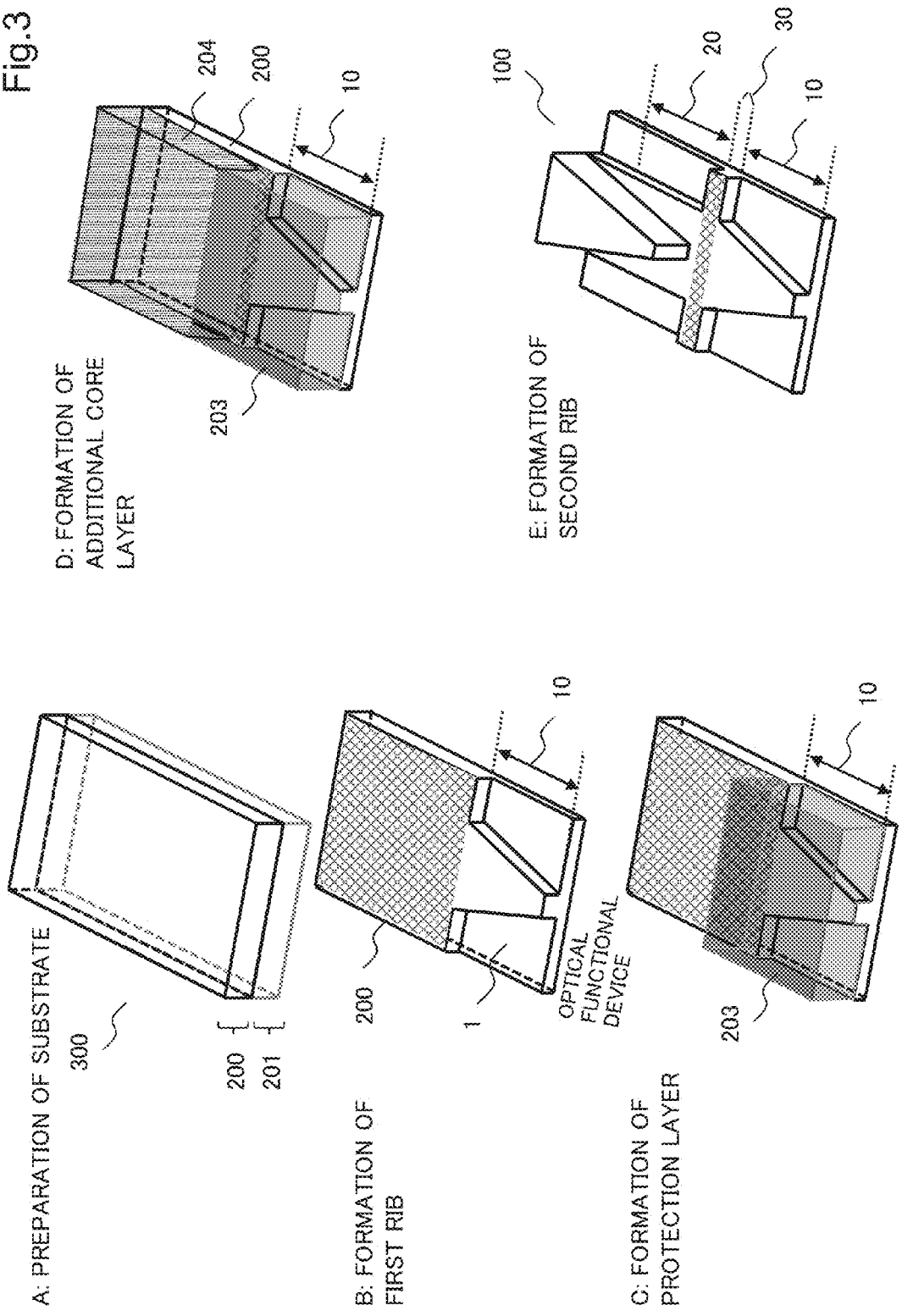
FIG. 3 is a diagram showing an example of a manufacturing method of an optical waveguide in the first exemplary embodiment of the present invention.

A substrate 300 in which a core layer 200 is arranged on a cladding layer 201 is prepared (A in FIG. 3: (Preparation of substrate). The thickness of the core layer 200 can be made to be the height of the optical waveguide of an optical functional device to be connected, for example. As a result, etching of the upper face part of the optical waveguide of an optical functional device is unnecessary, and manufacturing becomes easy. Hereinafter, illustration of the cladding layer 201 will be omitted.

Next, the first rib 10 is formed in the core layer 200 (FIG. 3B: Formation of the first rib). The upper surface of the core layer 200 that has high flatness preliminarily can be used as an upper surface of the first rib 10. In this case, there is no deterioration of the flatness by etching, and the first rib 10 will be an optical waveguide which is low-loss. On this occasion, the thickness of the slab layer 1 is made to be the same as that of the slab layer of the optical waveguide of an optical functional device. Further, the level of the upper surface of the first rib 10 in the height direction can be made to be the same as that of the upper surface of the barrier layer 30. Both of these arrangements enable to manufacture a rib simultaneously with an optical functional device and the like, and thus manufacturing is simplified. At this stage, it is a state that an upper surface of the core layer 200 in an area where the second rib 20 is formed is left just as it is.

Next, a protection layer 203 which covers the first rib 10 is formed. This protection layer 203 also covers an area of the core layer 200 not including the first rib 10, the area neighboring the first rib 10. The neighboring area here means a margin that can be set up in the formation area of the protection layer 203 considering a formation error of the protection layer 203 and also aiming at covering the first rib 10 completely. In other words, the protection layer 203 partially covers an area for forming the second rib 20 also, and the region which is not covered by the protection layer 203 is made to be only the area for forming the second rib 20 (FIG. 3C: Formation of protection layer).

Next, an additional core layer 204 is formed in the area for forming the second rib 20 on the core layer 200 (FIG. 3D: Formation of additional core layer). In this process, only an area for forming the second rib 20 in which the core layer 200 is remaining just as it is being selected as the area in which the additional core layer 204 is made to be formed, and, further, that area has an enough size and can make the additional core layer 204 grow to have a good thick film.

The additional core layer 204 that has been formed in the process indicated in FIG. 3D is etched in a multiple-stage manner to form the second rib 20 having the first layer 21 and the second layer 41 (FIG. 3E: Formation of second rib). Because the first rib 10 and the second rib 20 are etched in separated processes, the barrier layer 30 deriving from formation of the protection layer 203 is formed in an accompanying manner as shown in FIG. 3E. A detailed specific example of the process shown in FIG. 3E is shown in FIG. 16. In the process of FIG. 16 (E-1), a protection film 205 is formed by lithography on the upper surface of the additional core layer 204 in the laminating direction, and, henceforth, the second layer 41 and the first layer 21 are formed by etching the additional core layer 204 and the core layer 200 in a multiple-stage manner from (E-2) to (E-3).

Although not shown, a cladding layer is deposited after the process of FIG. 3E in this manufacturing method. By arranging a cladding layer also in the upper layer, oxidation of the core layer 200 can be prevented and low-loss conversion of the principal mode of light can be provided for a long time. Besides the illustrated manufacturing method, other manufacturing methods which can produce the optical waveguide 100 of this exemplary embodiment may be used.

[Description of Action]

Next, action of the optical waveguide 100 will be described with reference to FIG. 1. Here, description will be made by an example in which the diameter of the principal mode of light is expanded by light being guided by the optical waveguide 100 in one direction from "one side" to "the other side".

First, the diameter of the principal mode of light which enters the first rib 10 from the first end 11 side is magnified in the width direction of FIG. 1 with low loss in the course of being guided in the first taper part 13. In the boundary of the second end 12 and the barrier layer 30 and the boundary of the barrier layer 30 and the third end 22, a difference in electromagnetic field distribution of the principal mode of guided light occurs, causing transmission loss. However, because the third end 22 has approximately the same width with the second end 12, electromagnetic field distribution of the principal mode of light at each boundary surface does not differ, and transmission loss is reduced. Further, even when light is guided in any one of a direction to expand the diameter of the principal mode and a direction to reduce it, transmission loss is the same. In addition, as a result of making the width of the third end 22 wide sufficiently relative to the thickness of the barrier layer 30, the polarization dependence of transmission loss of guided light can be reduced.

Next, when light which enters the first layer 21 of the second rib 20 from the third end 22 is guided from the laminated part of the first layer 21 and the second layer 41 toward "the other side", as the second taper part 44 becomes wider, the diameter of the principal mode is magnified with low loss in the laminating direction (height direction in FIG. 1) this time. Here, because the fifth end 42 has a limited width, the shapes of a mode of light differ significantly between before and behind its tip position generally, and thus transmission loss occurs. However, by making the third end 22 and the second end 12 approximately the same width, the width of the first layer 21 becomes sufficiently wider than that of the fifth end around the fifth end 42. For this reason, light is shut in the first layer 21 much, and the electromagnetic field distribution of light is also shut inside the first layer 21 mostly. Therefore, few changes in electromagnetic field distribution of light occur between before and behind the tip position of the fifth end 42, and thus transmission loss can be suppressed.

Figure 18:
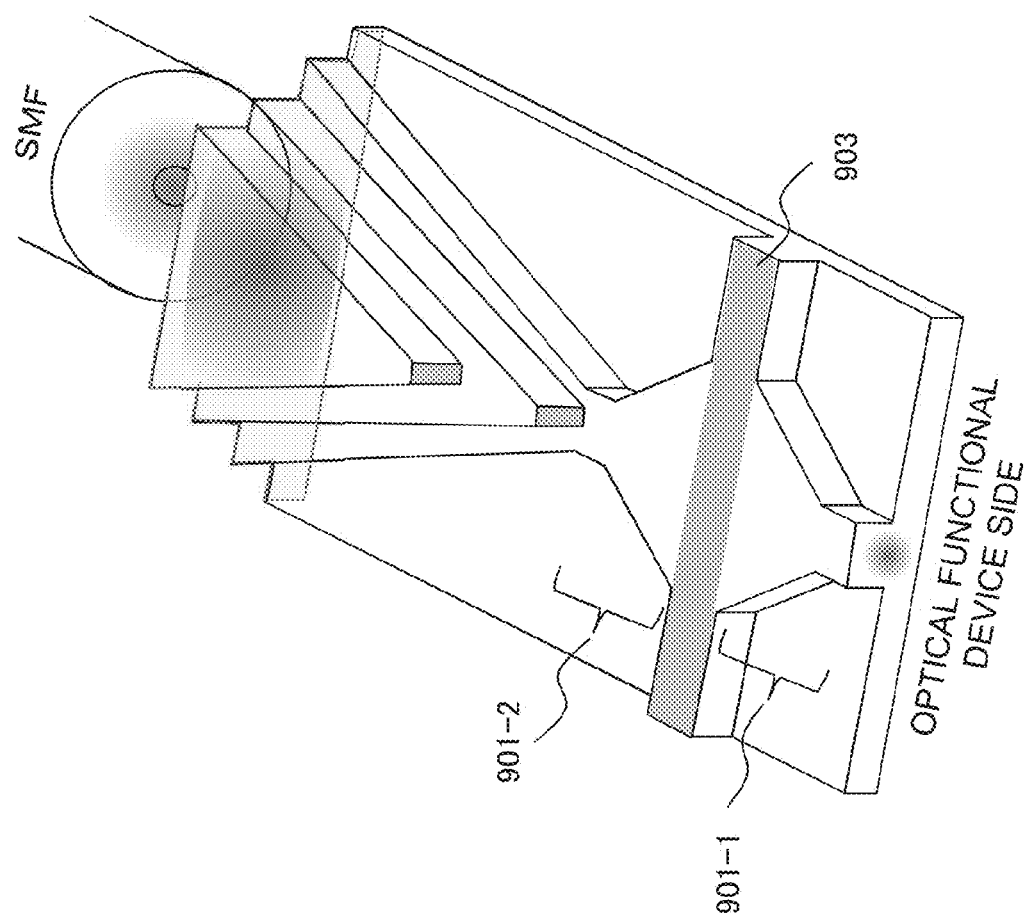
FIG. 18 is a diagram showing an example in which the technology described in non-patent document 2 is applied to an optical waveguide having a spot size conversion function.

From the above reason, when the principal mode of light is wanted to be expanded in the height direction, it is necessary to provide a taper part in the upper stage after widening the rib width of the lower layer sufficiently in advance. Moreover, as shown in FIG. 18, in the technology described in non-patent document 1, a rib width which becomes narrow once due to taper structures 901-1 and 901-2 existing before and behind the barrier layer 30 is needed to be expanded once again, and thus there is a problem that the optical waveguide of the lower layer becomes long. However, because the taper structure 901-2 in FIG. 18 is not needed if it is a structure in which a rib width is wide sufficiently just like the third end 22 in this exemplary embodiment, expansion of a rib width mentioned above is unnecessary, resulting in enabling suppression of the length of the optical waveguide 100. By suppressing the above-mentioned length, loss caused by roughness of a side wall of an optical waveguide formed at the time of manufacturing can also be reduced.

Thus, by light being guided in the optical waveguide 100 in one direction from "one side" to "the other side", the diameter of the principal mode of the light is expanded. Here, although an example in which the diameter of the principal mode of light is expanded by light being guided in the optical waveguide 100 in one direction from "one side" to "the other side" has been shown, it goes without saying that the diameter of the principal mode of light is reduced by light being guided in the optical waveguide 100 in a direction from "the other side" to "one side".

[Description of Effect]

As mentioned above, the optical waveguide 100 in this exemplary embodiment is an optical waveguide in which the first rib 10 and the second rib 20 are installed on the slab layer 1 along one direction from "one side" to "the other side", and a barrier layer 30 is connected between the first rib 10 and the second rib 20, wherein the first rib 10 has the first taper part 13 that becomes wider from the first end 11 in "one side" to the second end 12 connected with the barrier layer 30; wherein the second rib 20 has the first layer 21 and the second layer 41 laminated on a face of the slab layer 1 in turn; wherein the first layer 21 has approximately the same width with the second end 12 and has a shape with a width that is the same or becomes wider from the third end 22 connected with the barrier layer 30 to the fourth end 23 in "the other side"; wherein the second layer 21 has the second taper part 44 with a width that becomes wider from the fifth end 42 in "one side" to the sixth end 43; and wherein both of one end and the other end of the barrier layer 30 in the one direction has a width wider than the second end 12 and the third end 22. Consequently, according to the first exemplary embodiment, it is possible to make an optical waveguide having a spot size conversion function short. Besides, the number of optical waveguides which can be produced from one substrate becomes large, and the production cost of an integrated optical functional device can be reduced.

It is desired to use silicon of a refractive index of about 3.5 for the slab layer 1, the first rib 10 and the second rib 20. That is, it is desired to use the above-mentioned silicon for the core layer 200 in its manufacturing process. Also, it is desired to use silicon dioxide of a refractive index of 1.5 for a cladding layer.

It is desired to make the height of the first layer 21 be the same as the height of the first rib 10. By making the height of the second end 12 and the third end 22 be the same as described above in addition to the widths of them being approximately the same, transmission loss before and behind the barrier layer 30 is further suppressed.

It is desired that the end faces of the fourth end 23 and the sixth end 43 are aligned. Also, it is desired that the sixth end 43 has approximately the same width as the fourth end 23.

It is desired that the fifth end 42 is near the barrier layer 30 as close as possible along the one direction. By this, the length of the optical waveguide 100 can be suppressed.

It is desirable that the sixth end 43 is formed aligned with the fourth end 23.

Although the second rib 20 has total of two layers of the first layer 21 and the second layer 41 in this exemplary embodiment, more layers can be provided. The first layer 21 and the second layer 41 may be connected optically sandwiching an adhesive material or the like, or may be laminated directly.

[Second Exemplary Embodiment]

Figure 4:
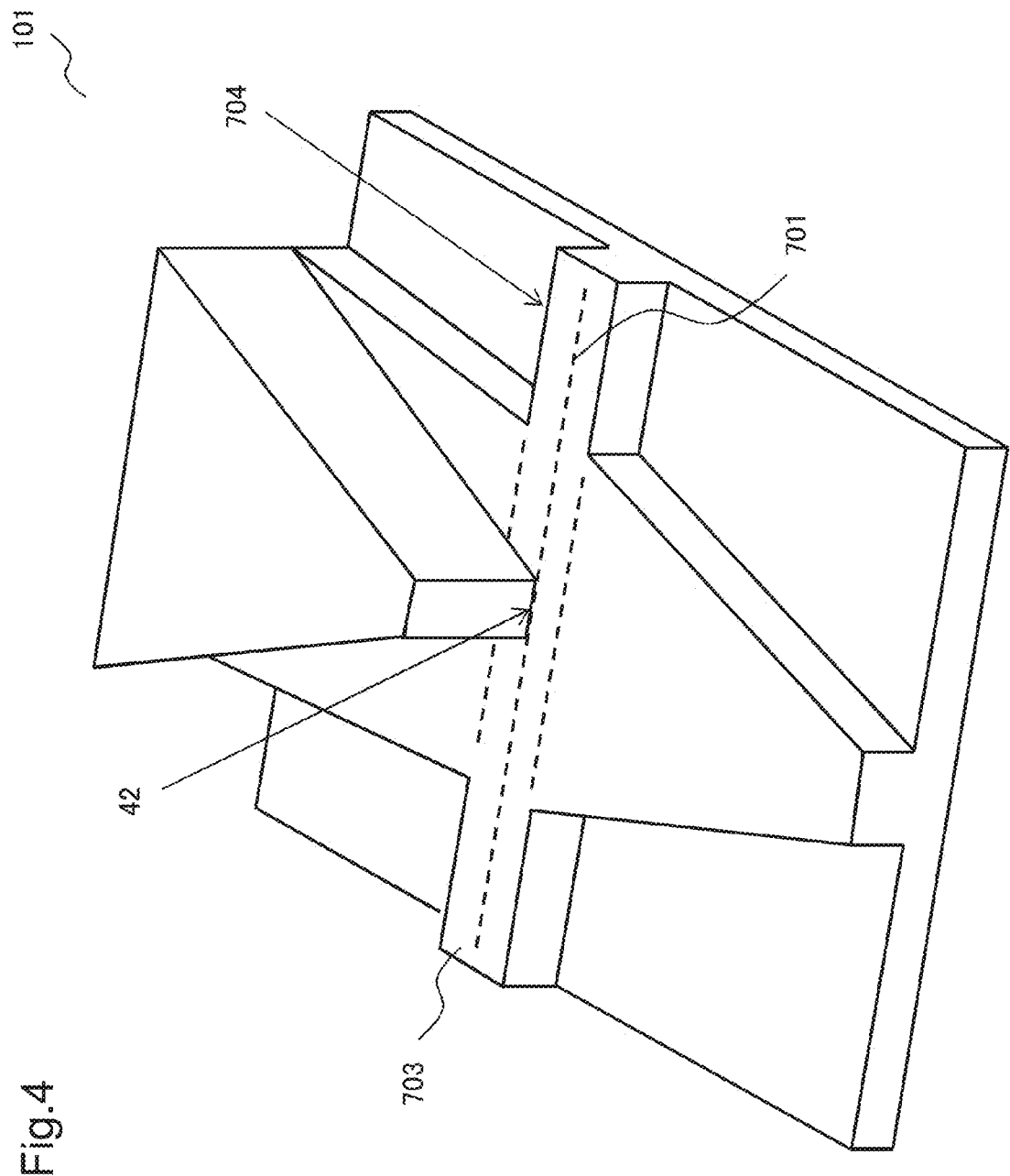
FIG. 4 is a diagram showing an exemplary configuration of an optical waveguide in a second exemplary embodiment of the present invention.

The second exemplary embodiment of the present invention will be described. FIG. 4 indicates a bird's eye view of an exemplary configuration of an optical waveguide in the second exemplary embodiment of the present invention. An optical waveguide 101 in the second exemplary embodiment is different from the optical waveguide 100 in the first exemplary embodiment in a point that the fifth end 42 touches a step existing in the upper surface of the barrier layer 30 in the height direction. That is, between the first exemplary embodiment and the second exemplary embodiment, it is different in the positions of the fifth end 42 along one direction from "one side" to "the other side".

[Description of Manufacturing Method]

Figure 5:
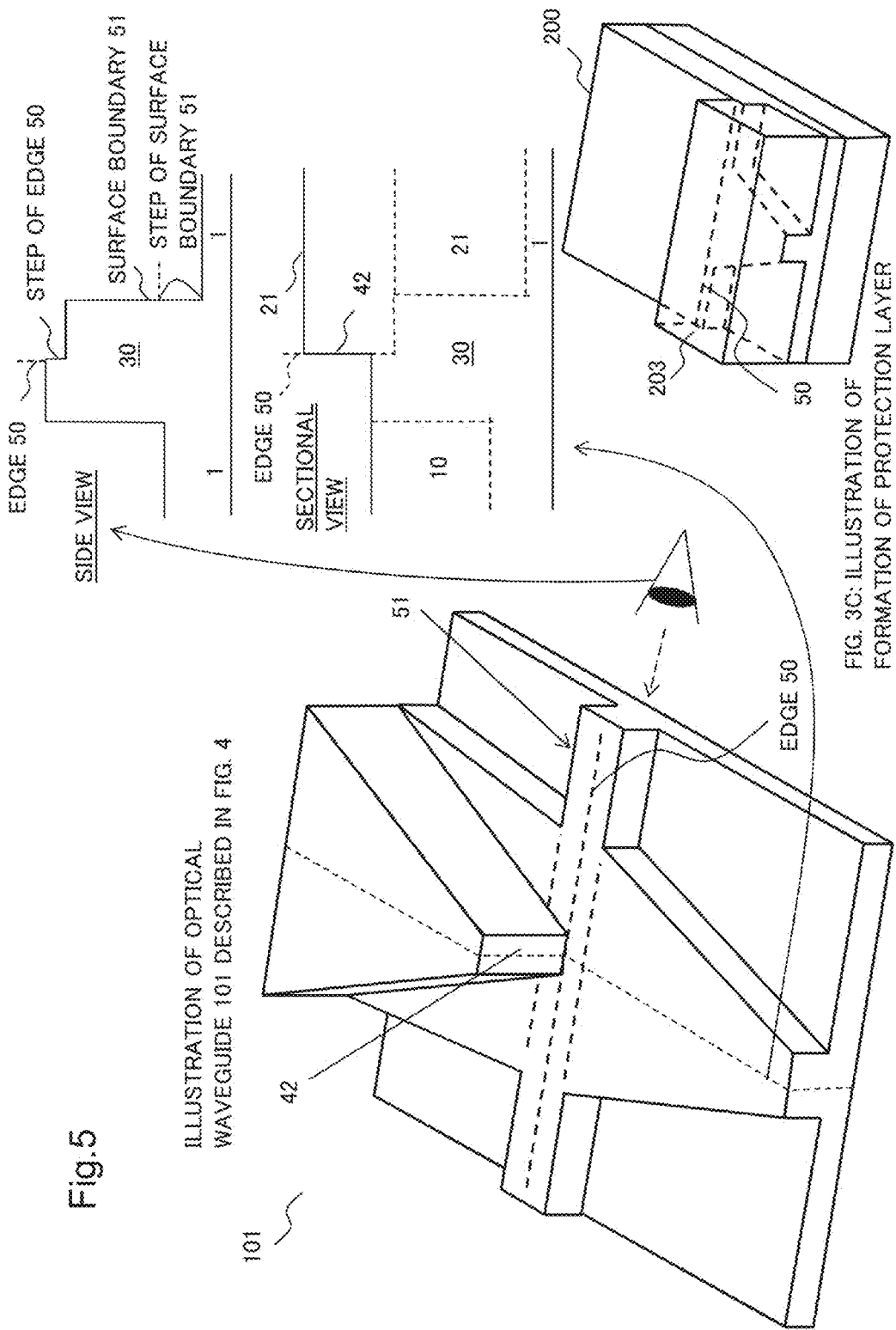
FIG. 5 is a diagram showing an example of a manufacturing method of an optical waveguide in the second exemplary embodiment of the present invention.

In FIG. 5, there are shown a process of formation of a protection layer of FIG. 3C (the lower right in FIG. 5), the structure of the optical waveguide 101 of FIG. 4 (the left in FIG. 5) and a figure in which a side view and a sectional view of the optical waveguide 101 are compared (the upper right in FIG. 5). The protection layer 203 of the first rib 10 formed in the process of FIG. 3B is indicated at the lower right in FIG. 5. This protection layer 203 covers also part of an area for forming the second rib 20 up to an edge 50 indicated at the lower right in FIG. 5. In this state, only in an area for forming the second rib 20 where the core layer 200 is remaining just as it is, formation of the additional core layer 204 and multiple-stage etching is performed by a process at least different from the process for formation of the first rib 10. A detailed specific example of the process shown in FIG. 3E is shown in FIG. 17. Only the protection film 205 formed in the upper surface of the additional core 204 in a laminating direction is different from the specific example indicated in the first exemplary embodiment (FIG. 16). Thus, the first rib 10 and the second rib 20 are formed in areas before and behind the edge 50 taking it as a boundary along the one direction.

[Description of Action]

Because, in the process of forming the second rib 20, it is not necessary to make a condition of etching be the same as that of at the time of forming the first rib 10, it can be performed by a different condition. In other words, the second rib 20 is formed by a different process and, in some cases, by different conditions. Therefore, by a reason of different conditions, or by a manufacturing error even in a case of a process (etching in the case of this specific example) under same conditions, steps occur in the edge 50 and in a surface boundary 51 vertically to the one direction as shown in FIG. 5. The fifth end 42 is in contact with the step of the edge 50 between the steps. Although an example of each step is shown in the side view in the upper right in FIG. 5, the sizes and the like of the steps have been scale-adjusted appropriately to make it easy to be understood. As shown in the side view in the upper right in FIG. 5, the step of the edge 50 is caused at the time of formation of the second layer 41 when etching the additional core layer 204 from its upper part, and the step of the surface boundary 51 at the time of formation of the first layer 21 and the slab layer 1.

Figure 6:
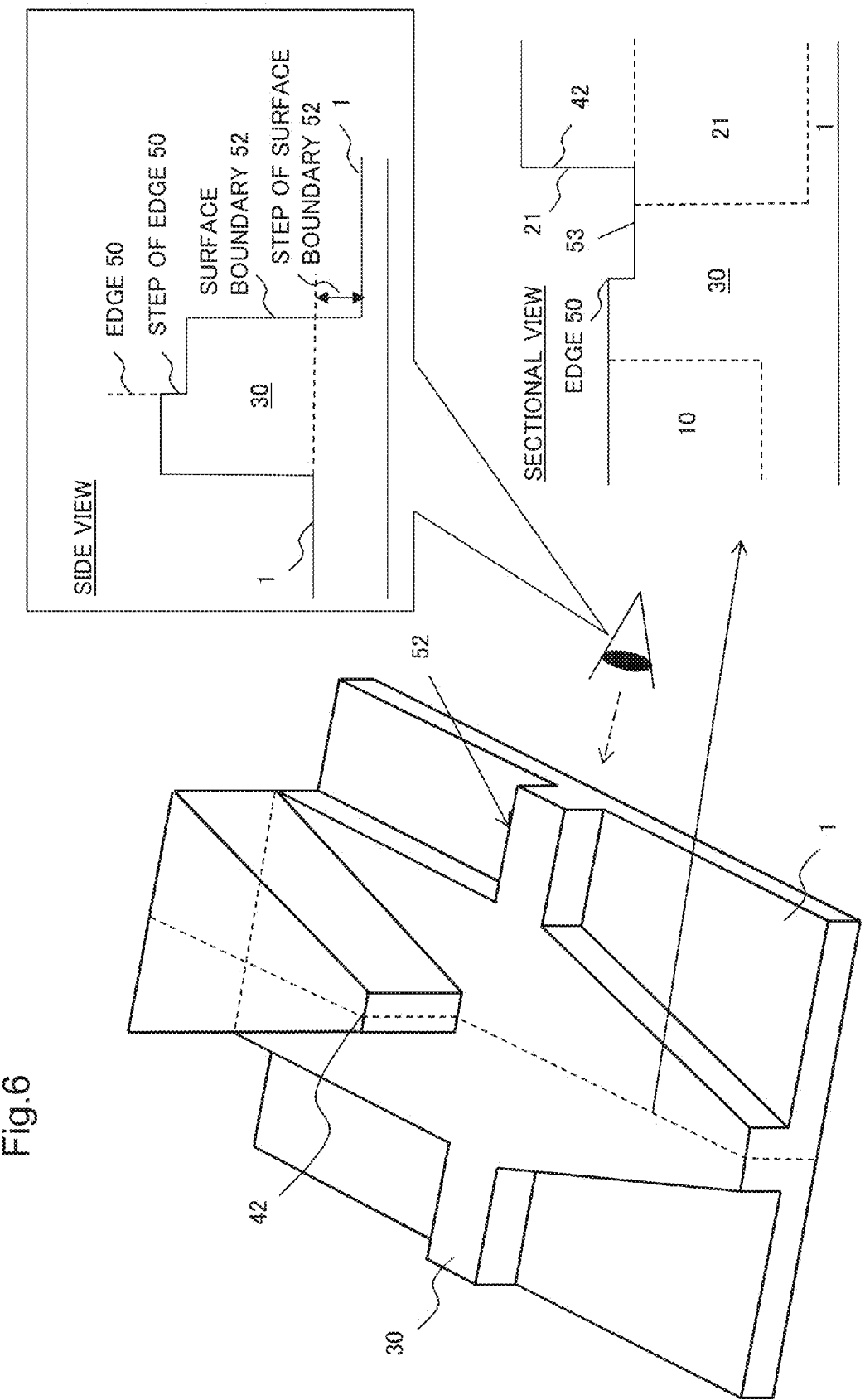
FIG. 6 is a diagram illustrating comparison with the exemplary configuration of an optical waveguide in the first exemplary embodiment of the present invention.

Similarly, even when producing the structure of the optical waveguide 100 in the first exemplary embodiment by a process shown in FIG. 3, steps occur in the edge 50 and a surface boundary 52 before and behind the barrier layer 30 as shown in the side view and the sectional view along the waveguide route of light shown in the right in FIG. 6. However, as shown in the sectional view in the right in FIG. 6, it is different from the optical waveguide 101 in the second exemplary embodiment in a point that it has a step starting from the edge 50 and reaching the fifth end 42 (the first step 53 in the right in FIG. 6).

Figure 7:
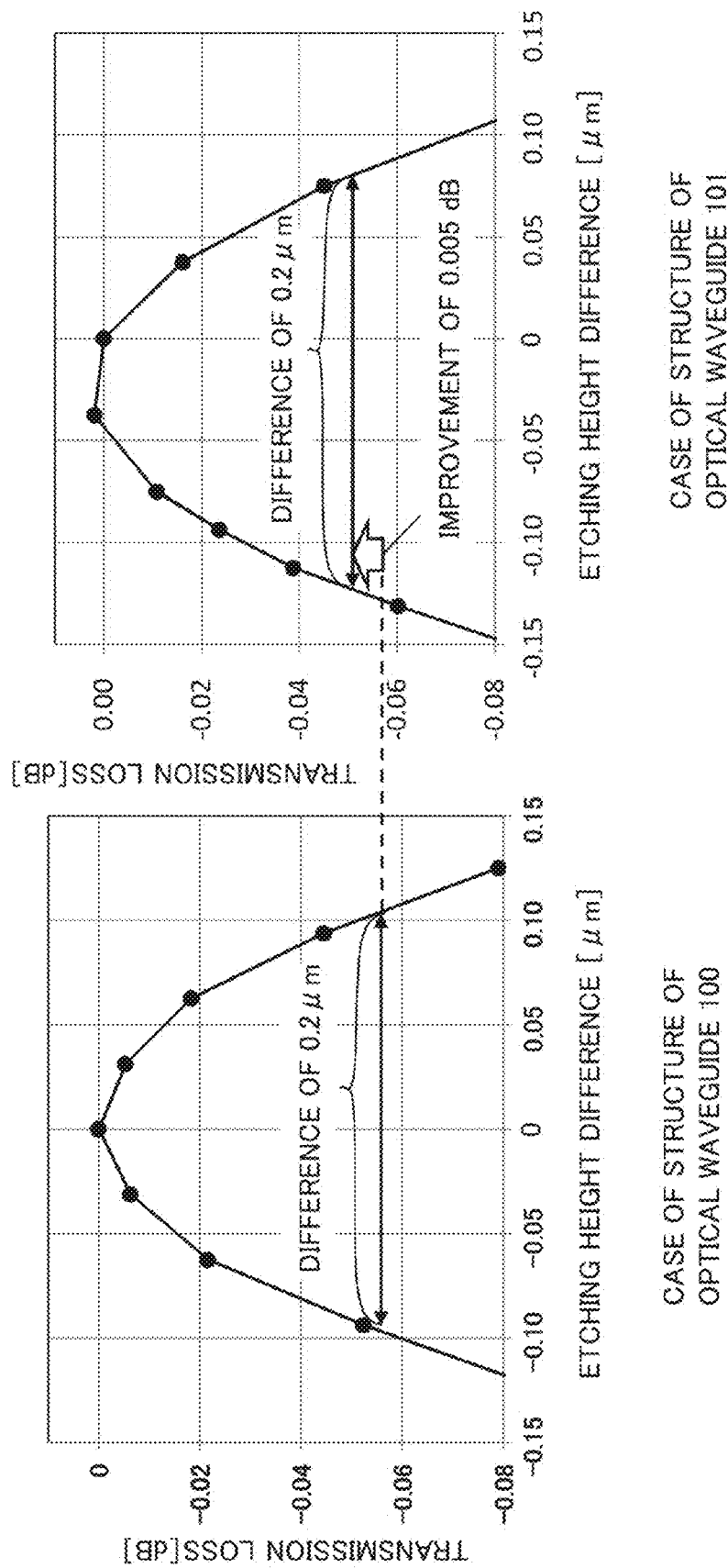
FIG. 7 is a diagram showing a calculation result of mismatch loss caused by a step of the exemplary configuration of an optical waveguide in the second exemplary embodiment and the first exemplary embodiment of the present invention.

A calculation result of transmission loss caused by mismatch of modes of light due to the above-mentioned steps in the case where the widths of the first rib 10 and the first layer 21 is made to be 4 μm and the thicknesses of the barrier layer 30 be 3 μm is shown in FIG. 7. Here, transmission loss is the negative of a value calculated by subtracting an emission light intensity from an incident light intensity of guided light. The left of FIG. 7 indicates a result when the fifth end 42 is of a structure of the optical waveguide 100. The right of FIG. 7 indicates a result when the fifth end 42 is of a structure of the optical waveguide 101 in the second exemplary embodiment. The minus side of the horizontal axis in the figure indicates a case where a step in the side of the first rib 10 is lower, and the plus side a step in the side of the first rib 10 is higher.

As shown in FIG. 7, when a step or a difference in height is formed between the first rib 10 and the second rib 20, loss is caused. As indicated in the left in FIG. 7, loss in the minus side is larger in the horizontal axis (etching height difference). As indicated in this exemplary embodiment, loss in the minus side can be suppressed by making it be of a structure in which the fifth end 42 touches the step of the edge 50 which is in the upper surface of the barrier layer 30 in the height direction as indicated in the right in FIG. 7. For example, as indicated in the right in FIG. 7, loss improvement of 0.005 dB can be realized against 0.2 μm of difference, for example, compared with the structure of the optical waveguide 100 of the first exemplary embodiment in the left in FIG. 7. Thus, the optical waveguide 101 in this exemplary embodiment can suppress loss caused by a step which is formed in a manufacturing process.

[Third Exemplary Embodiment]

Figure 8:
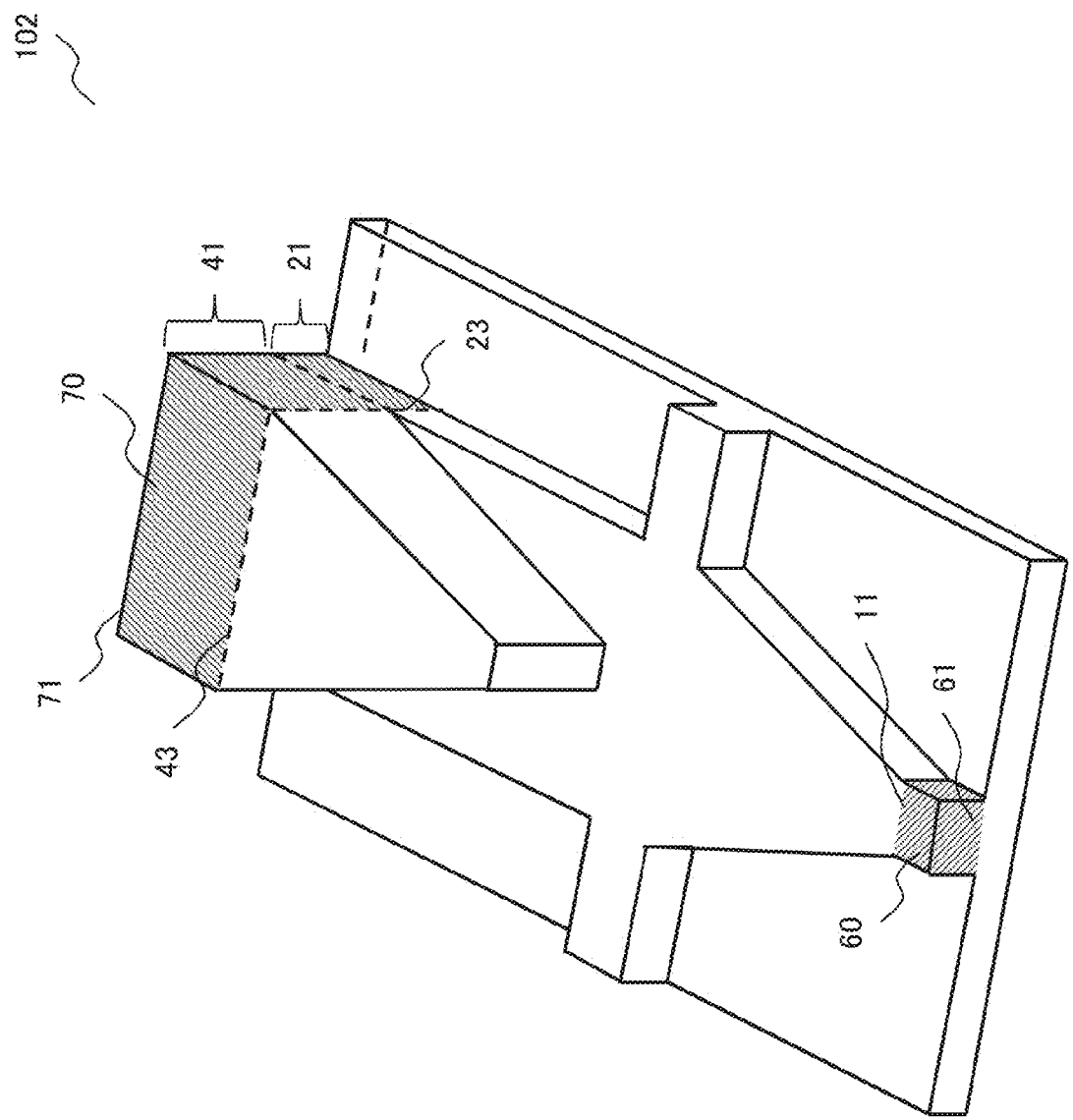
FIG. 8 is a diagram showing an exemplary configuration of an optical waveguide in a third exemplary embodiment of the present invention.

The third exemplary embodiment of the present invention will be described. There is shown in FIG. 8 a bird's eye view of an exemplary configuration of an optical waveguide 102 in the third exemplary embodiment of the present invention.

Figure 9:
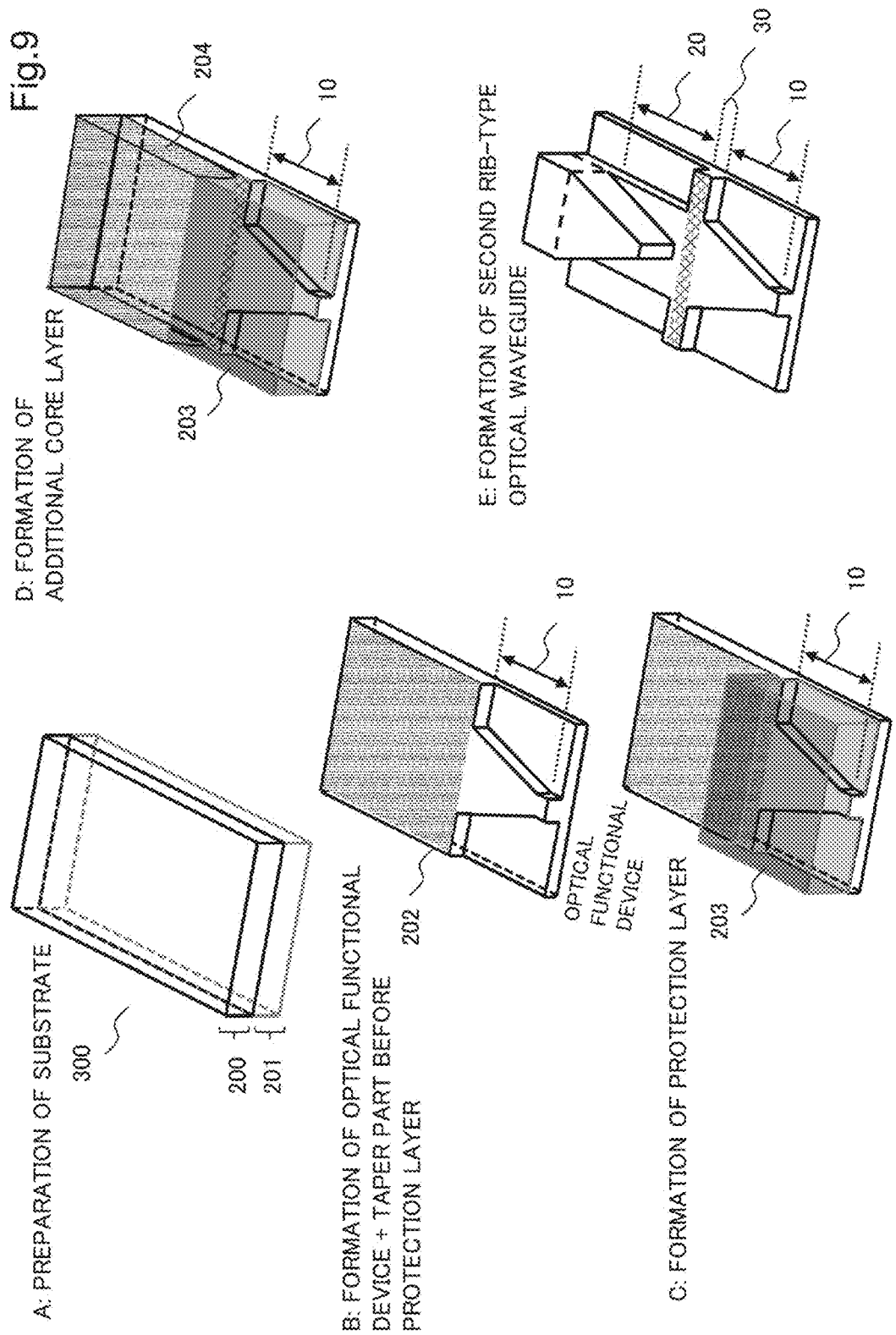
FIG. 9 is a diagram showing an example of a manufacturing method of an optical waveguide in the third exemplary embodiment of the present invention.

The optical waveguide 102 in the third exemplary embodiment is different from the optical waveguide 100 in the first exemplary embodiment in a point that it further possesses a first joint 60 extended with approximately the same width as the first end 11 and a second joint 70 extended with approximately the same width as the sixth end 43 and the fourth end 23. As shown in FIG. 9, the manufacturing method of the optical waveguide 102 is similar to the manufacturing method of the optical waveguide 100.

The first joint 60 has one end which is connected with the first end 11 and the other end with which the optical waveguide of another optical functional device or the like can be connected with. Similarly, the second joint 70 has one end which is connected with the fourth end 23 and the sixth end 43 and the other end with which another optical device or the like can be connected with. Henceforth, the other end by which the first joint 60 can be connected with the optical waveguide of another optical functional device or the like is indicated as a seventh end 61 for illustrative purpose. Similarly, the other end by which the second joint 70 can be connected with another optical device or the like is indicated as an eighth end 71.

EXAMPLE 1

Figure 10:
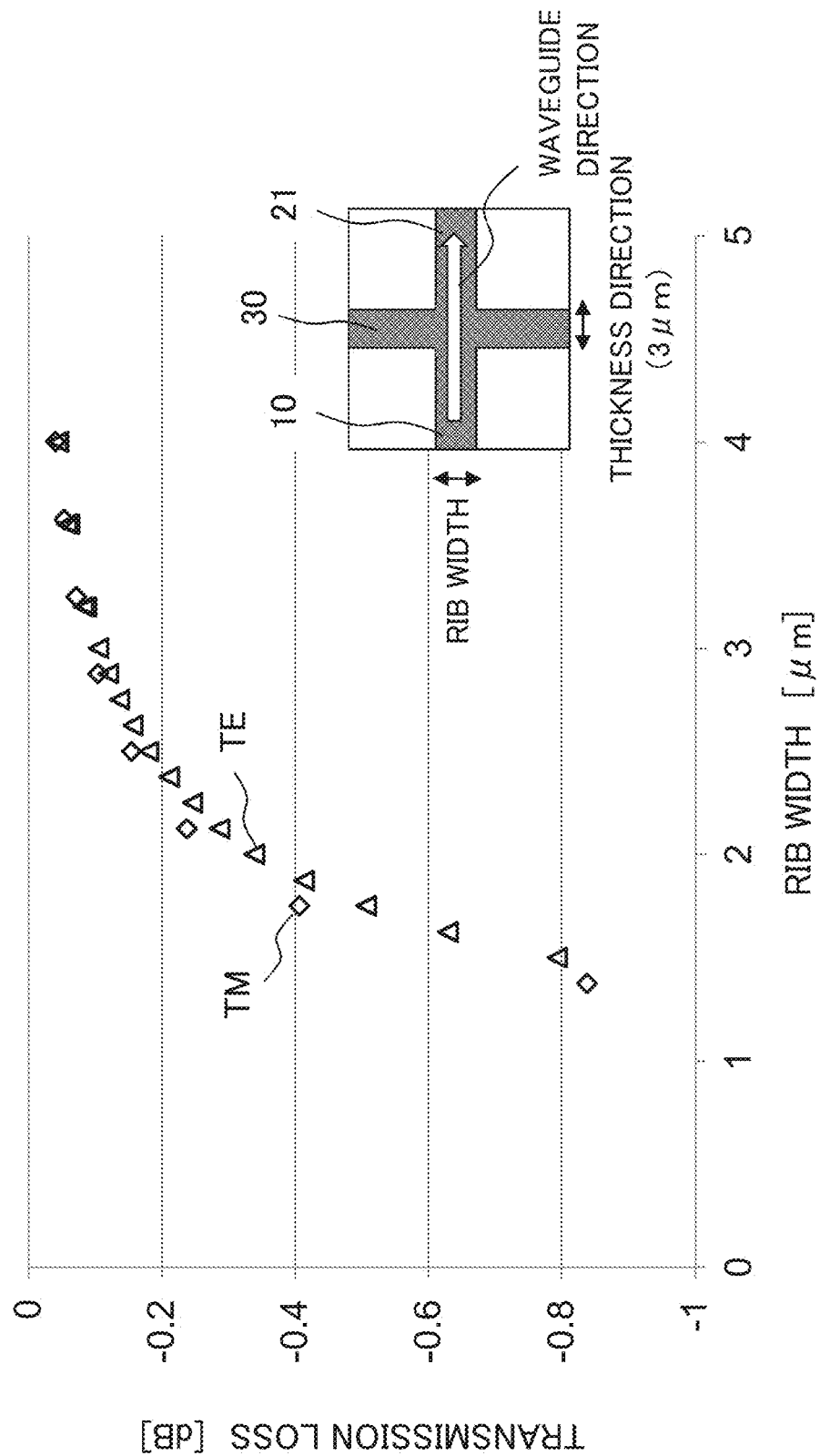
FIG. 10 is a diagram showing a calculation result of dependence of transmission loss to the width (rib width) of a first rib 10 and a second rib 20 before and behind the barrier layer of an optical waveguide in an example of the present invention.

A calculation result about the optical waveguide 102 in this exemplary embodiment is indicated below. In FIG. 10, a calculation result of dependence of transmission loss to the width of the first rib 10 and the second rib 20 (rib width) in the schematic illustration of FIG. 10 before and behind the barrier layer 30 (when its thickness is 3 µm) is shown. Here, calculation has been made supposing that a shape of the principal mode of light at the boundary surface between the second end 12 and the barrier layer 30 is an ellipsoid shape of 1 µm in height and 4 µm in width. As shown in FIG. 10, when the width of the third end 22 is expanded into 4 µm relative to the width of the principal mode of light of 4 µm, transmission loss can be reduced to a level of 0.05 dB or less. Further, a difference in transmission loss between TE (TE wave: Transverse Electric Wave) and TM (TM wave: Transverse Magnetic Wave) in FIG. 10 can be reduced. That is, it is found that polarization dependence of transmission loss of guided light is reduced by making a rib width wider than 1.2 µm described in non-patent document 2 to 4 µm. Moreover, coupling loss to higher-order modes becomes small because a rib width is made wider as mentioned above, and thus the taper structures 901-1 and 901-2 before and behind a barrier layer 903 as shown in FIG. 18 just like non-patent document 2 is not needed to be provided.

Figure 11:
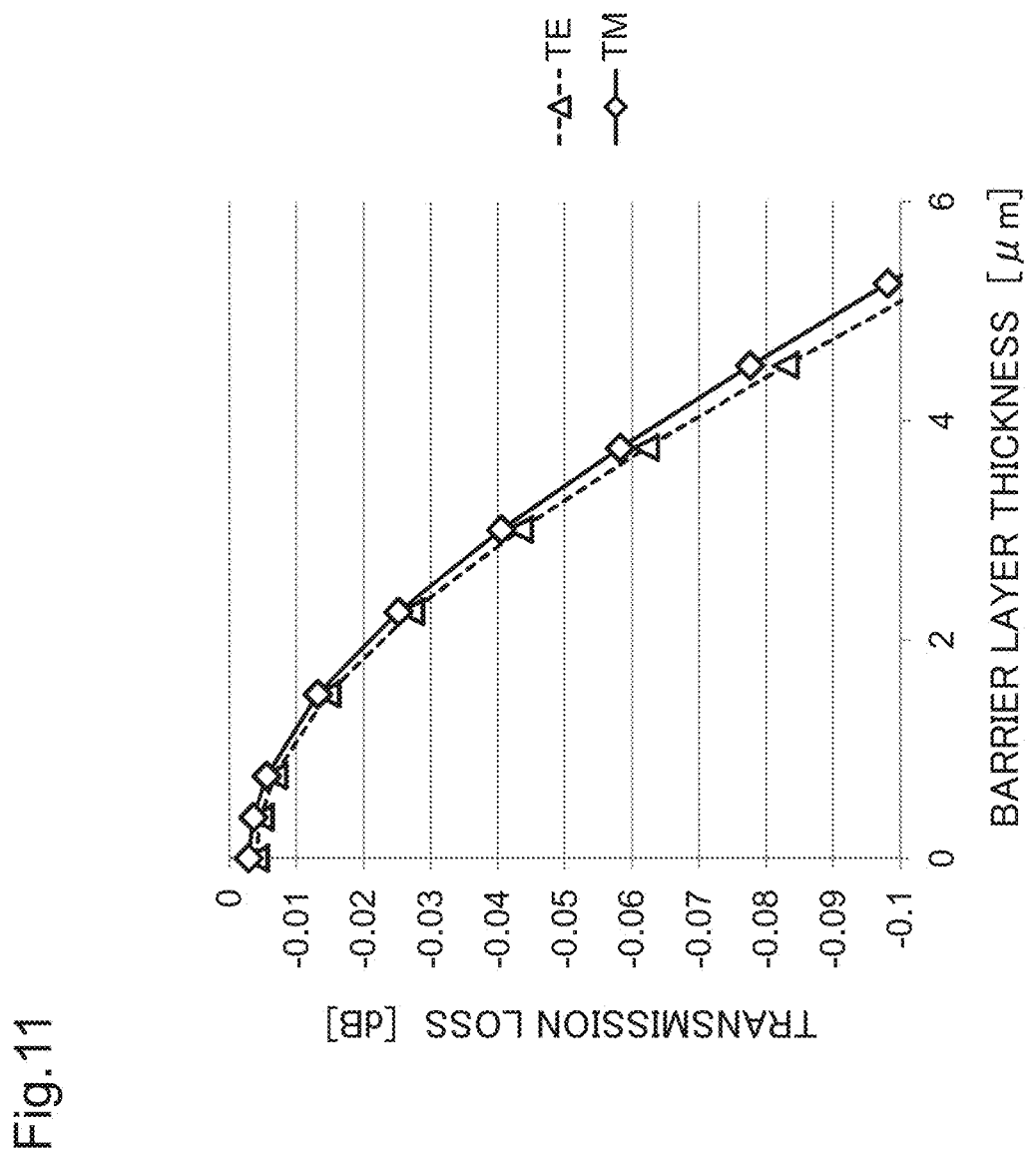
FIG. 11 is a diagram showing dependence of transmission loss of an optical waveguide in an example 1 of the present invention to thickness of a barrier layer.

Dependence of transmission loss to the thickness of the barrier layer 30 when rib widths of the first rib 10 and the second rib 20 are 4 µm is shown in FIG. 11. As shown in FIG. 11, by making thickness of the barrier layer 30 thin as far as possible, transmission loss of guided light can be reduced, and, in addition, polarization dependence can also be reduced.

Dependence of transmission loss of guided light to the width of the third end 22 (rib width) and the width of the fifth end 42 (tip width) is shown in FIG. 12. As shown in the comparative example in the left graph in FIG. 12, when a rib width is small (1.3 µm), transmission loss of 0.04 dB is caused if the tip width is 0.4 µm, for example. On the other hand, when a rib width is wide and is 4 µm as is the case with this example shown in the right graph of FIG. 12, transmission loss can be reduced to 0.02 dB which is about half of the above-mentioned transmission loss when the tip width is 1.3 µm.

Because the fifth end 42 has a limited width, the shape of a light mode changes greatly between before and behind its tip position generally, and thus transmission loss is caused. However, the wider the width of the third end 22 is, the more light is shut in the first layer 21, and electromagnetic field distribution of light is also shut inside the first layer 21 mostly. For this reason, in the structure of this example in the right in FIG. 12, transmission loss can be suppressed compared with the comparative example in the left in FIG. 12, because electromagnetic field distribution of light rarely changes between before and behind the tip position of the fifth end 42.

In the example 1, the widths of the fifth end 42 and the third end 22 are 0.4 µm and 4 µm, respectively. In order to obtain the above-mentioned effect, it is desirable that the width of the third end 22 is 10-20 times of the width of the fifth end 42.

Figure 13:
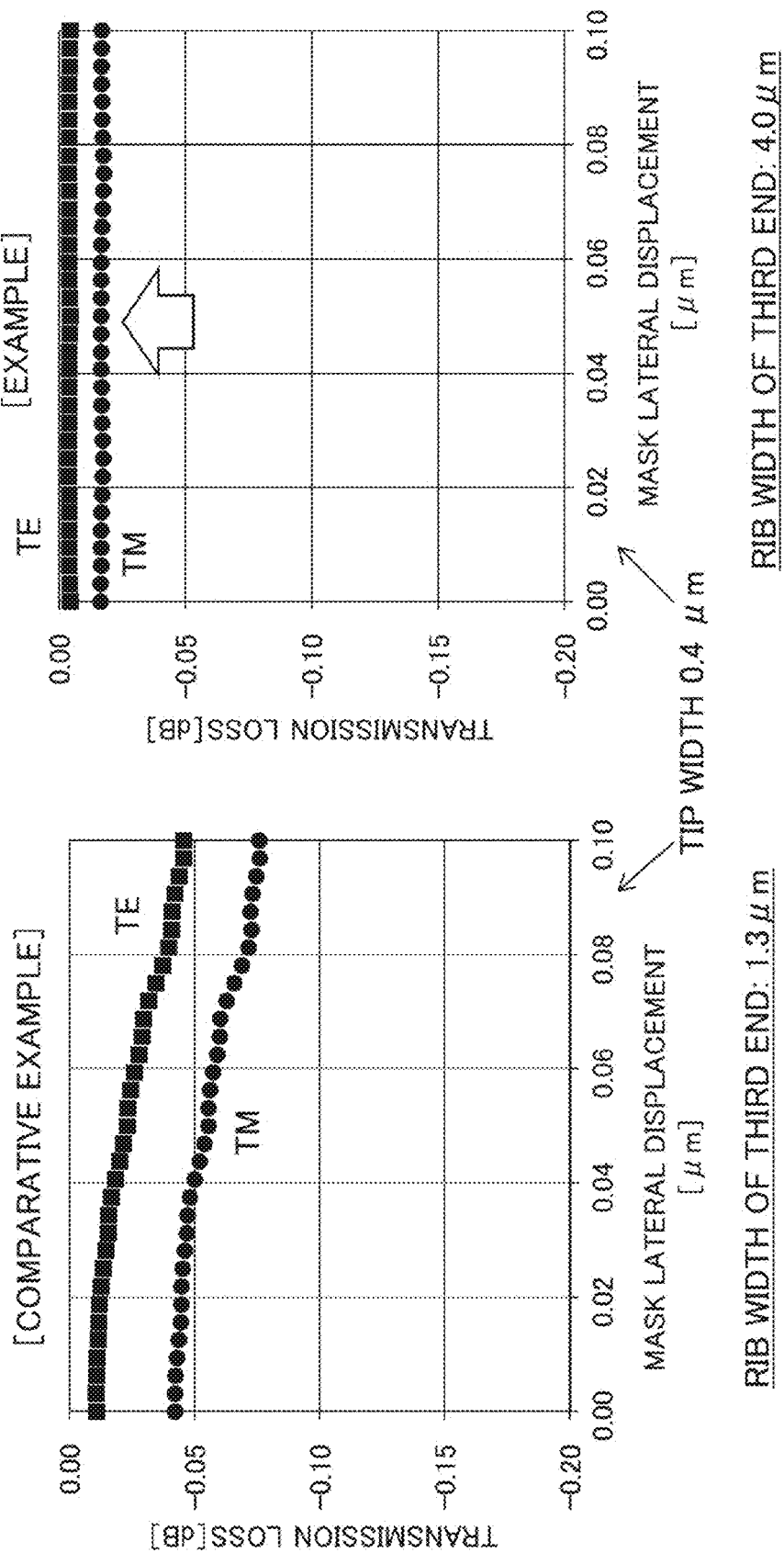
FIG. 13 is a diagram showing dependence of transmission loss of an optical waveguide in the example 1 and a comparative example of the present invention to a lateral discrepancy of the fifth end from the center of the third end.

In FIG. 13, there is shown dependence of transmission loss of guided light to lateral displacement of the fifth end 42 from the center of the third end 22. There is a possibility that the fifth end 42 shifts in a lateral direction (width direction) by deviation (about 50 nm) of mask positions due to precision issues at the time of production. However, because of the structure in which a rib width of the first layer 21 is wide sufficiently, a mask lateral displacement dependence of transmission loss can be suppressed as shown in FIG. 13. When the biggest shift of 50 nm occurs, while loss increases up to 0.06 dB in the comparative example in the left in FIG. 13 (an example in which the rib width of the third end 22 is 1.3 µm), loss can be made small in the structure of this example in the right in FIG. 13 (an example in which the rib width of the third end 22 is 4.0 µm) to one third of that of the comparative example.

EXAMPLE 2

Figure 14:
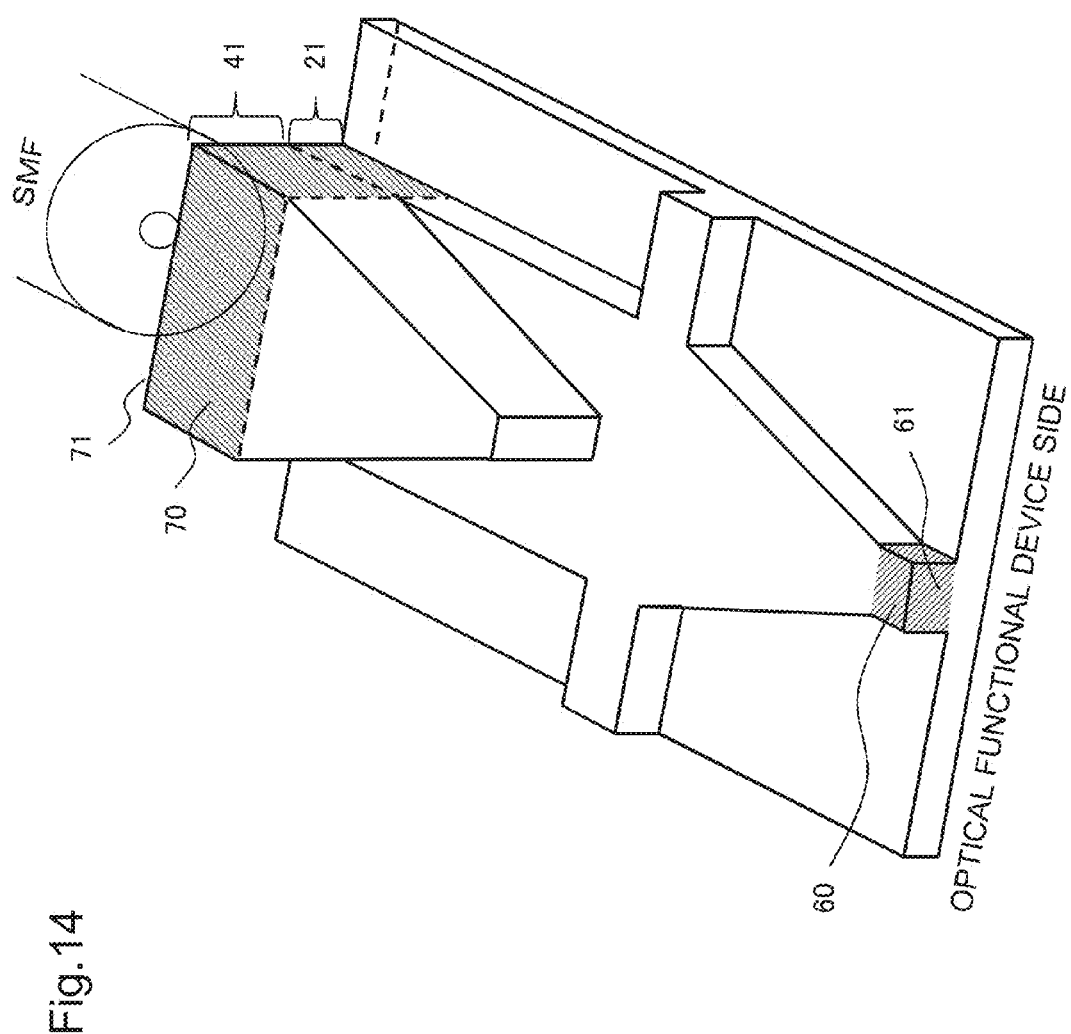
FIG. 14 is a diagram showing a structure of an optical waveguide of an example 2 of the present invention.

As one usage example of the optical waveguide 102 in this exemplary embodiment, a case where an optical functional device is connected to the seventh end 61 and an optical fiber is connected to the eighth end 71 will be described below. In FIG. 14, there is shown an optical waveguide 103 in this example. Hereinafter, description will be made supposing that the shape of the principal mode of light in the side of the seventh end 61 is of a circular shape having a diameter of 1 µm and the principal mode of light in the side of the eighth end 71 is of a circular shape of 4 µm diameter.

As shown in FIG. 14, the cross section of the first joint 60 at the seventh end 61 has approximately the same shape as the optical waveguide of an optical functional device which is expected to be connected, and is of 1 µm square in this example. Further, the thickness of the slab layer 1 is made to be approximately the same thickness as the slab layer of an optical functional device to be connected. By making it such structure, the optical waveguide of an optical functional device which is expected to be connected with the optical waveguide 102 in this exemplary embodiment can be produced simultaneously by etching, and thus manufacturing can be simplified.

In addition, the eighth end 71 of the second joint 70 is of 4 µm square that corresponds to the principal mode of light guided in an optical fiber which is expected to be connected (Single Mode Fiber (SMF) is indicated in the figure as an example). Because the mode of light in the side of the optical fiber is centrosymmetric, the mode of light in the side of the optical waveguide is also made to be centrosymmetric in order to reduce coupling loss. Because a mode diameter in the side of an optical fiber is generally larger than that of the optical waveguide side, the eighth end 71 can be made larger up to about 7 μm square. Further, coupling loss can be also reduced by fitting only the height of the eighth end 71 or the width of the second layer 41 to the mode diameter of the optical fiber side. However, when making only the height or the width fit thus, coupling loss with an optical fiber increases due to deterioration of the inner symmetry if the ratios between height and width differ greatly.

Here, the structure when applying the technology described in non-patent document 2 (taper structures 901-1 and 901-2 in FIG. 18) and the structure of example 2 will be compared. Here, a code used in this example is used appropriately for a common structure. When making the principal mode of light in the first end 11 side be a circular shape of 1 μm diameter, the principal mode of light in the side of the fourth end 23 and the sixth end 43 be a circular shape of 4 μm diameter and the thickness of the barrier layer 30 be 3 μm, taper structures of 500 μm are needed in before and behind the barrier layer 30, respectively, when the technology described in non-patent document 2 is applied Further, for conversion of the principal mode of light in the height direction, it is needed to have an optical waveguide of 800 μm long (it corresponds to the second rib 20) being connected with one of the above-mentioned taper structures and including the first layer 21 having a gradually-widened width and a multilayer structure to make the diameter of the principal mode expand in the height direction (this corresponds to the second layer 41) laminated on the first layer 21. That is, about 1800 μm of length is needed for the structure related to the conversion of the diameter of the principal mode of light.

However, in the structure of the optical waveguide 102 in this example, one taper structure existing between the barrier layer 30 and the second rib 20 among the above-mentioned taper structures is unnecessary, and 500 μm of shortening can be made, first. Furthermore, when the first layer 21 is made to have the third end 22 of 4 μm and have a structure in which its width increases gradually up to the width of the second joint 70 that is connected with an optical fiber from the third end 22 to the fourth end 23, the length of the second rib 20 can be suppressed to be 500 μm, and thus 300 μm of shortening can be made. In other words, 800 μm of shortening can be made totally. In this structure, loss has been improved by 0.15 dB as a whole device compared with the structure when applying the technology described in non-patent document 2 mentioned above.

Figure 15:
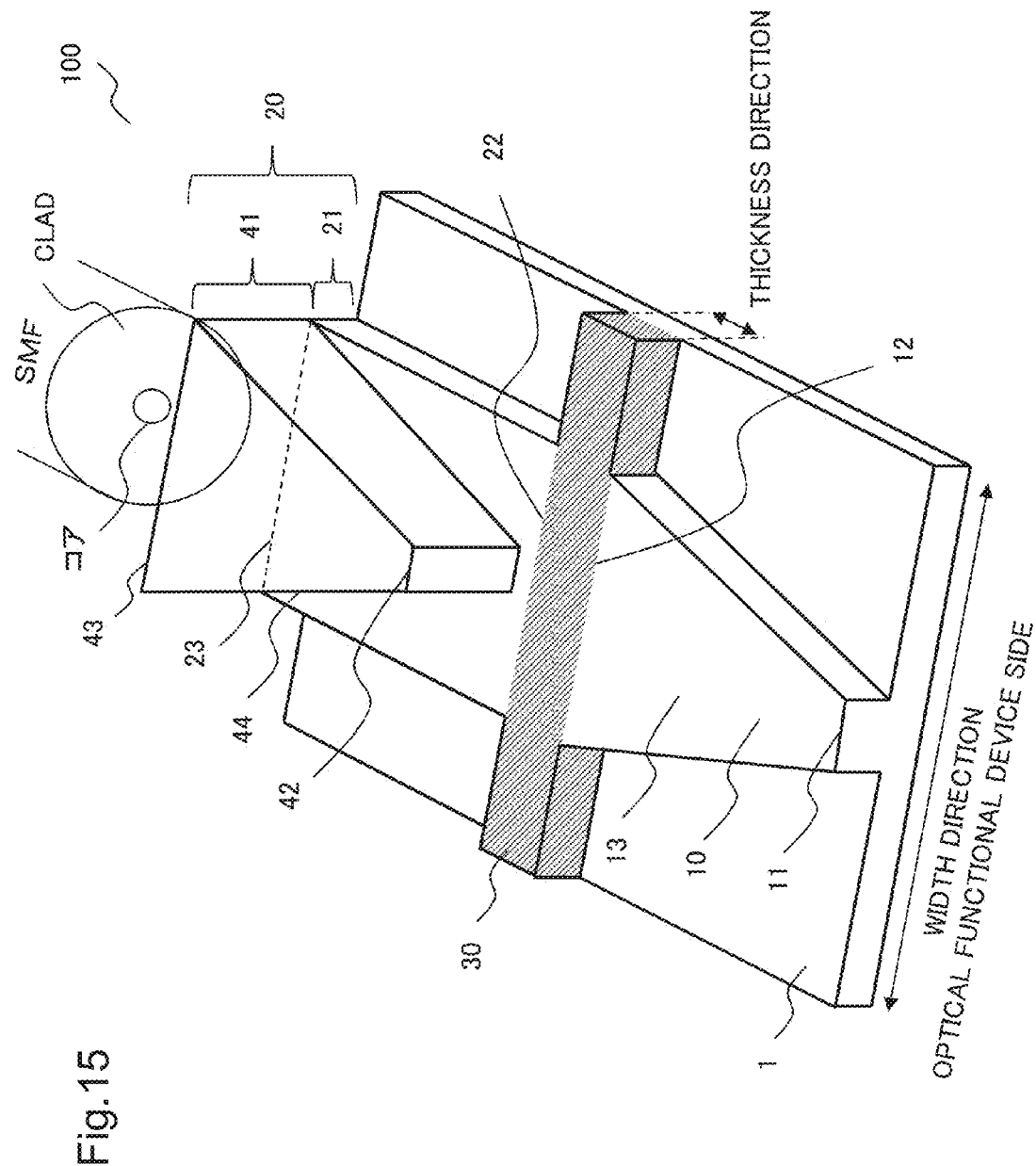
FIG. 15 is a diagram showing an exemplary configuration when applying the structure of an optical waveguide of the first exemplary embodiment of the present invention.

Also in the optical waveguide 100 of the first exemplary embodiment and the optical waveguide 101 in the second exemplary embodiment, the cross section of the first end 11 can be made to have approximately the same shape as that of the optical waveguide of an optical functional device which is expected to be connected, as shown in FIG. 15. By making it such structure, manufacturing can be simplified by a reason that has been mentioned earlier in the example 2.

Making it such structure may be applied not only to an optical functional device, but also to other optical members and optical devices which are expected to be connected, or to the second joint 70.

Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Further, it is noted that the inventor's intent is to retain all equivalents of the claimed invention even if the claims are amended during prosecution.

The invention claimed is:

1. An optical waveguide having a first rib and a second rib being provided on a slab layer along one direction from one side to the other side, and a barrier layer being connected between said first rib and said second rib, comprising:
    said first rib including a first taper part having a width widening from a first end in said one side to a second end connected with said barrier layer;
    said second rib including a first layer and a second layer laminated on a face of said slab layer in turn;
    said first layer having an approximately same width as said second end and being of a shape having one of a same width and a width widening from a third end being connected with said barrier layer to a fourth end in said other side;
    said second layer having a second taper part having a width widening from a fifth end in said one side to a sixth end; and
    both of one end and the other end of said barrier layer in said one direction having a width wider than said second end and said third end.

2. The optical waveguide according to claim 1, wherein said fifth end touches a step existing in an upper surface of said barrier layer in a height direction.

3. The optical waveguide according to claim 1, wherein said sixth end is formed in a manner being aligned with said fourth end.

4. The optical waveguide according to claim 1, wherein upper surfaces of said first rib and said first layer in a height direction are in nearly a same surface.

5. The optical waveguide according to claim 1, further comprising a first joint being extended from said first end with an approximately same width.

6. The optical waveguide according to claim 5 connected with an optical functional device by said first joint.

7. The optical waveguide according to claim 1, wherein said sixth end has an approximately same width as said fourth end.

8. The optical waveguide according to claim 7, further comprising a second joint being extended from said sixth end and said fourth end with an approximately same width.

9. The optical waveguide according to claim 8 connected with an optical fiber by said second joint.

10. The optical waveguide according to claim 1, wherein a cross section of said first end in a laminated part of said first rib and said slab layer is approximately 1 μm square.

11. The optical waveguide according to claim 1, wherein a cross section of said first end has approximately a same shape as a cross section of an optical waveguide of an optical functional device to be connected.

12. The optical waveguide according to claim 1, wherein width and height of a cross section in a laminating direction in said fourth end and said sixth end in a laminated part of said first layer, said second layer and said slab layer is 4-7 μm.

13. The optical waveguide according to any one of claim 1, wherein a width of said third end is 10-20 times as large as a width of said fifth end.

14. The optical waveguide according to claim 1, wherein said first rib, said second rib and said slab layer are silicon.

15. The optical waveguide according to claim 1, wherein a width of said third end is made to be wide relative to a thickness of said barrier layer.

16. A manufacturing method of an optical waveguide, comprising the steps of:

forming a first rib in a core layer of a substrate, said substrate having said core layer arranged on a cladding layer;

forming a protection layer for covering said first rib and an area neighboring said first rib among areas of said core layer not including said first ribs;

forming an additional core layer onto said core layer not covered by said protection layer; and forming a second rib having a first layer and a second layer by applying multiple-stage etching to said additional core.

17. The manufacturing method of the optical waveguide according to claim 16, wherein said additional core layer is formed in contact with said protection layer.

* * * * *